US007392157B1

(12) United States Patent
Delurgio et al.

(10) Patent No.: US 7,392,157 B1
(45) Date of Patent: Jun. 24, 2008

(54) MODEL UPDATE

(75) Inventors: Phillip Dennis Delurgio, Foster City, CA (US); Brian Frederick Babcock, San Mateo, CA (US); Dirk Manfred Beyer, Walnut Creek, CA (US)

(73) Assignee: M-Factor, Inc., San Mateo, CA (US)

( * ) Notice: Subject to any disclaimer, the term of this patent is extended or adjusted under 35 U.S.C. 154(b) by 0 days.

(21) Appl. No.: 11/591,652

(22) Filed: Oct. 31, 2006

(51) Int. Cl.
*G06F 17/00* (2006.01)

(52) U.S. Cl. ........................................ 702/181; 702/187

(58) Field of Classification Search ................ 702/179, 702/181, 187; 705/1, 10, 500; 700/29–32, 700/111, 106; 706/21, 45, 62
See application file for complete search history.

(56) References Cited

U.S. PATENT DOCUMENTS

| 6,546,303 | B1 * | 4/2003 | Fried et al. ................. 700/106 |
| 6,606,615 | B1 * | 8/2003 | Jennings et al. ............... 706/45 |
| 6,876,988 | B2 * | 4/2005 | Helsper et al. ................ 706/21 |
| 6,993,494 | B1 * | 1/2006 | Boushy et al. ................ 705/10 |
| 7,080,026 | B2 * | 7/2006 | Singh et al. .................. 705/10 |
| 7,110,960 | B2 * | 9/2006 | Phillips et al. ................ 705/10 |
| 7,212,978 | B2 * | 5/2007 | Kowal et al. ................... 705/1 |
| 7,213,007 | B2 * | 5/2007 | Grichnik ...................... 706/21 |
| 2005/0055175 | A1 * | 3/2005 | Jahns et al. .................. 702/182 |

OTHER PUBLICATIONS

LeBaron, 'Building the Santa Fe Artificial Stock Market', Jun. 2002, BU Publicaiton, pp. 1-19.*
Wolfe et al., 'Introducing SAS Forecast Studio', 2005, SAS Publicaiton, pp. 1-16.*
Georges, 'Staggered Updating in an Artificial Financial Market', Sep. 2006, Hamilton College, Clinton NY, pp. 1-18.*

* cited by examiner

*Primary Examiner*—Edward Raymond
*Assistant Examiner*—Elias Desta
(74) *Attorney, Agent, or Firm*—Blakely, Sokoloff, Taylor & Zafman LLP

(57) ABSTRACT

Methods and apparatuses for updating a forecast model quantifying the marketing of to the demand for a product and/or service are described. An original forecast model created at a reference M is used. An error of the forecast model is determined based on data including an original data and an additional data. At least one parameter is identified to be changed in value in, added to, or removed from the original forecast model. The forecast model is then modified to reduce the error of the forecast model by changing the value of the identified parameter in the forecast model, adding the identified parameter to the original forecast model, and/or removing the identified parameter from the original forecast model.

42 Claims, 12 Drawing Sheets

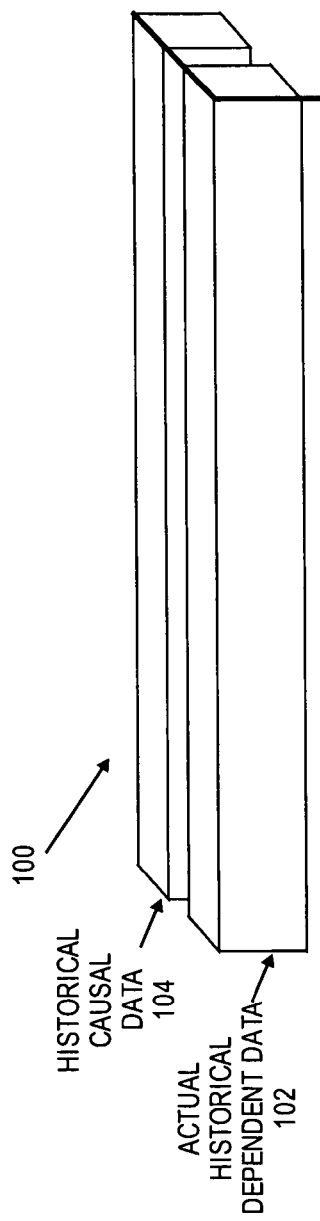
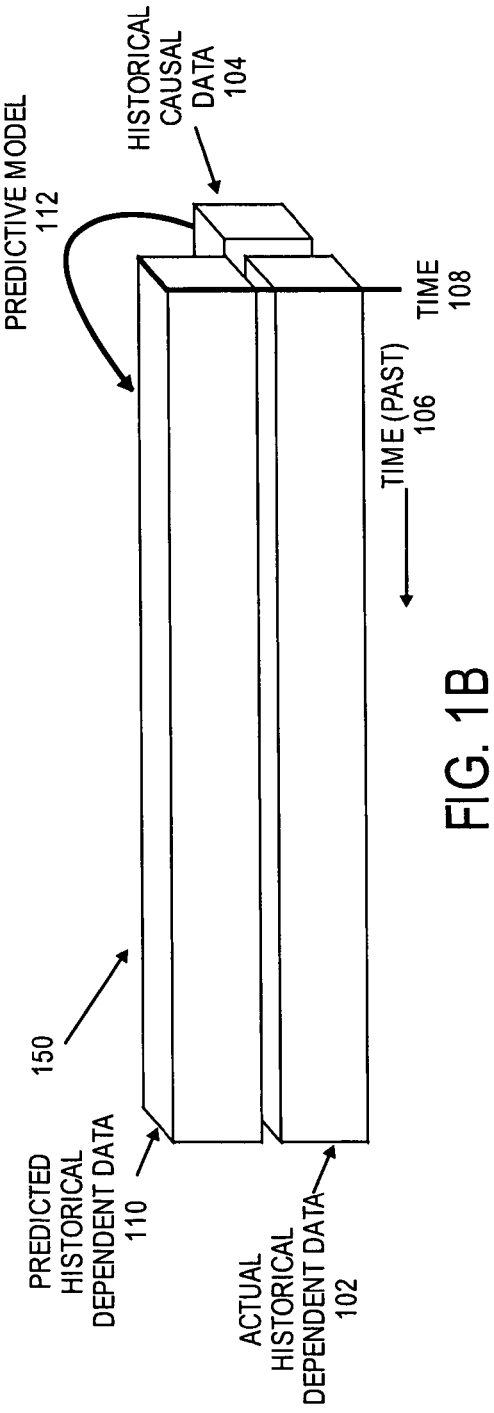
FIG. 1A (PRIOR ART)
FIG. 1B (PRIOR ART)

MODEL UPDATE

FIELD OF THE INVENTION

This invention relates generally to analysis of multi-dimensional data and more particularly to dynamic multi-dimensional analysis of consolidated enterprise data supporting creating and analysis of predicted data. The invention further relates to the updating of a forecast model for the analysis of consolidated enterprise data.

BACKGROUND OF THE INVENTION

For many companies, it is desirable to forecast the financial future of a product or service offered by the company. For example, a company may want to know the approximate change in future sales, growth, and profit of the product or service. In addition, many companies want to know the effects of changes in causal events (e.g., marketing, advertising, and/or pricing changes) on forecasted data (e.g., sales volume, growth, and/or profit) and how these changes affect future of the offered product or service. As a result, many companies use a forecast model encompassing many pieces of causal data to predict forecasted data.

To obtain a forecast model, companies hire a marketing scientist or firm to create a new forecast model from previously collected data (causal and dependent). As time progresses and situations in the company and its atmosphere change, the created forecast model becomes less reliable and thus out of date. Therefore, many companies will ask the scientist or firm to create a new model every one or two years.

One problem with periodically creating a new model is the cost associated with creating a new model. Creating a new forecast model is extremely resource (e.g., computer resources) and time intensive. As a result, the cost of creating a new forecast model can be prohibitive for many companies.

Another problem is that the forecast models may become inaccurate over time, and thus become unable to forecast changes in demand for products or services under time sensitive or new marketing operations. For example, a medium for advertising that has not before been entered by a company would not be handled well by the forecast model in predicting the new medium's effectiveness for advertising. In a specific example, a new advertising medium beginning to take shape is advertising on online game arcade websites or within video games sold for PC's and console machines (e.g., Microsoft's® Xbox360® and Sony's® Playstation® series). If Coca-Cola® wishes to pursue the possibility of advertising in an upcoming Xbox360® game and has only recently begun advertising in other games (i.e., after the last forecast model was created), then the forecast model would not be able to predict the effectiveness of advertising in the upcoming Xbox360® game.

Another problem is that use of an older forecast model diminishes the confidence of the user and company in the forecast model's results. Thus, greater indecisiveness in marketing decisions could be created through the growing mistrust in the older forecast model.

Therefore, what is needed is an apparatus and method for updating an existing forecast model.

SUMMARY OF THE DESCRIPTION

Methods and apparatuses for updating a forecast model quantifying the marketing of to the demand for a product and/or service are described. In one embodiment, the method includes receiving an original forecast model created at a reference M. The method also includes receiving an original data and an additional data to determine an error of the forecast model, the additional data created from the reference M to a reference N, wherein the original data is the data created up to reference M and the additional data is the data created from reference M to reference N and further wherein the original data is an at least a subset of all of the data created up to reference N. The method further includes identifying at least one parameter to be changed in value in, added to, or removed from the original forecast model. The method also includes determining the error of the forecast model using the original data and/or the additional data. The method further includes modifying the forecast model to reduce the error of the forecast model, wherein modifying the forecast model includes changing the value of the identified parameter in the forecast model, adding the identified parameter to the original forecast model, and/or removing the identified parameter from the original forecast model.

BRIEF DESCRIPTION OF THE DRAWINGS

The present invention is illustrated by way of example and not limitation in the figures of the accompanying drawings in which like references indicate similar elements.

FIG. 1A is a block diagram illustrating one embodiment of the relationship of actual historical dependent data to causal data.

FIG. 1B is a block diagram illustrating one embodiment of the relationship of predicted historical dependent data calculated based on historical causal data.

DETAILED DESCRIPTION

Figure 2:
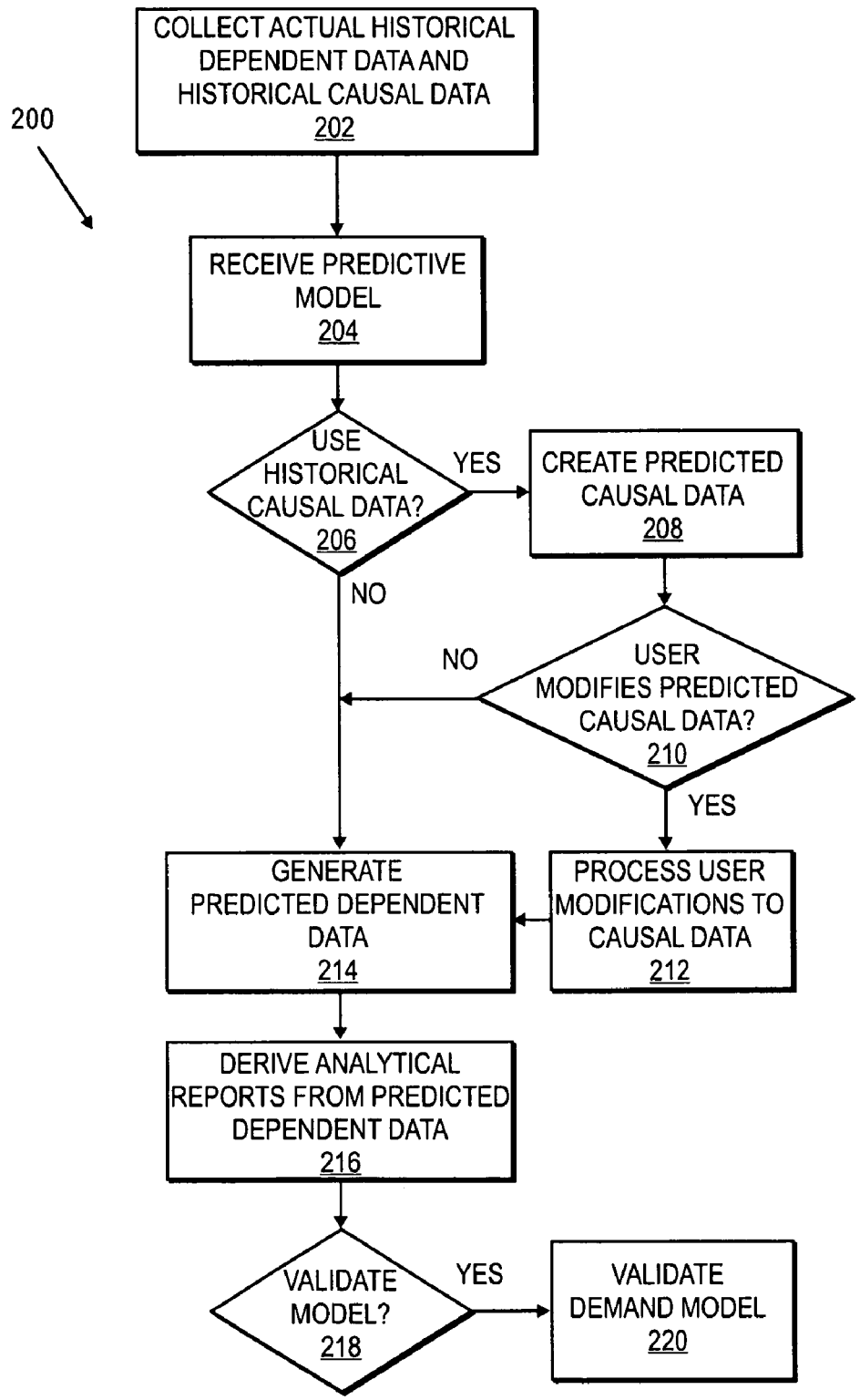
FIG. 2 is a flow diagram of one embodiment of a process for generating predicted dependent data from historical dependent data and causal data.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The Forecast Model

FIG. 1A is a block diagram illustrating one embodiment 100 of the relationship of actual historical dependent data 102 to historical causal data 104. In FIG. 1A, a cube of actual historical dependent data 102 represents a time series of data formed into a multi-dimensional cube. Although in one embodiment, the dimensions of actual volume cube 102 are time, products and locations, alternate embodiments may have more, less and/or different dimensions. Actual historical dependent data 102 ends at a specific time 108. The portion of the cube to the left of actual historical dependent data 102 represents the very earliest dependent data available.

To estimate a forecast model of the data in actual historical dependent data 102, an analyst collects historical causal data 104. Historical causal data 104 includes business drivers that potentially affect actual historical dependent data 102. A business driver is an anticipated activity that could affect actual historical dependent data 102. Examples of business drivers are, but are not limited to, in-store activities (e.g., price, display, etc.), advertising (e.g., targeted rating points, gross rating points, print circulars, etc.), weather (e.g., temperature, change in temperature, precipitation, etc.), distribution, competitive activity (own similar products as well as competition products), etc. Typically, the causal data is employed in a forecast model that predicts the historical dependent data. In addition, the forecast model aids an analyst in better understanding how influential each business driver is in affecting dependent data. For example, one set of dependent data may be sensitive to price, while other sets of dependent data are sensitive to seasonal or weather changes.

The embodiment in FIG. 1A is an illustration of one embodiment of actual historical dependent data 102 and historical causal data 104. However, actual historical dependent data 102 and historical causal data 104 do not always end at a specified time 108. In other embodiments, actual historical dependent data 102 and historical causal data 104 can be for any past time period and of varying length, such as a days, weeks, months, years, etc. Furthermore, actual historical dependent data information 102 and historical causal data 104 can have different time lengths or represent overlapping periods of time.

FIG. 1B is a block diagram illustrating one embodiment 150 of predicted historical dependent data 110 that is derived from causal data. Forecast model 112 is used to generate predicted historical dependent data 110 from historical causal data 104. There are many processes known in the art to create forecast models from causal dependent information. In addition, by comparing predicted historical dependent data 110 with actual historical dependent data 104, an analyst can determine the reliability of the forecast model 112. An analyst can use forecast model 112 as a basis for analyzing the results and determine the business drivers that affect actual historical dependent data 102 or predicted historical dependent data 110. Typically, the analyst infers or speculates about past/future trends and/or relationships based on actual historical dependent data 112. However, FIGS. 1A-B only illustrate results based on aggregated historical data and did not allow prediction of future results. Furthermore, an analyst cannot breakdown contributions to the dependent data due to the causal data (e.g., determine percent sales volume caused by advertising, price changes, weather fluctuations, etc.).

FIG. 2 is a flow diagram of one embodiment of a process 200 to generate predicted dependent data from historical dependent data and causal data. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 200 is performed by data processing system 800 of FIG. 8.

Returning to FIG. 2, at block 202, process 200 begins by processing logic collecting the historical dependent data and causal data (e.g. historical actual dependent data 102 and historical causal data 104 as illustrated in FIGS. 1A-B). In one embodiment, historical dependent data is typically the form of unit sales of equivalent products. Equivalence is used to normalize sales of a particular product that is sold in different packaging sizes. For example, for soda sales, one equivalent is 24 eight-ounce cans. Thus, two 12-pack cans of twelve ounce sodas are one and one half equivalents. At block 204, processing logic receives a forecast model using the predicted causal data. A forecast model is a mathematical model estimated by using the historical dependent and causal data. There are many processes known in the art to create forecast models from causal information. In one embodiment, a forecast model is shown in Equation (1):

$$\text{Volume} = \alpha + \beta_1 x_1 + \beta_2 x_2 + \ldots + \beta_n x_n = \alpha + \sum_{i=1}^{n} \beta_i x_i \quad (1)$$

where $\alpha$ is the intercept to represent the base level of demand for the product, $\beta_i$ are coefficients to quantify the expected dependent data response to $x_i$, and $x_i$ are the covariates. Covariates relate to the business drivers as described below. For example, in one embodiment, a simple forecast model for the sales volume of an item is based on display advertising, feature advertising (e.g. print advertising), price, weather and television advertising. The forecast model for this embodiment is:

$$\text{Volume} = \alpha + \beta_{Display} * \text{Display} + \beta_{Ad} * \text{Ad} + \beta_{Price} * \text{Price} + \beta_{TV} * \text{TV} + \beta_{Weather} * \text{Weather} \quad (2)$$

From Equation (1) or some other forecast model, processing logic computes the predicted dependent data.

As mentioned above, each covariate ($x_i$) relates to business drivers that potentially affect the dependent data. In one embodiment, the covariate is the business driver. Alternatively, processing logic mathematically transforms the business driver into the covariate. This is typically used when changes in the business driver do not affect the dependent data in a linear fashion. For example, the effect of product price on the volume may be large around $1.99/equivalent, but not large if the price were $3.99/equivalent. In this case, processing logic uses a covariate of ln(price) instead of price itself. Taking the example of the simple forecast model presented in Equation (2) above, processing logic would then use the forecast model of:

$$\text{Volume} = \alpha + \beta_{Display} * \text{Display} + \beta_{Ad} * \text{Ad} + \beta_{Price} * \ln(\text{Price}) + \beta_{TV} * \text{TV} + \beta_{Weather} * \text{Weather} \quad (3)$$

Processing logic supports numerous types of mathematical transforms of business drivers to covariates such as simple arithmetic transforms. Other covariates have time delaying effects. For example, an expenditure of advertising in one time period can continue to affect the dependent data for several successive time periods. To model this type of effect, a covariate is a decay function that decreases in time after an initial input value. Furthermore, more than one business driver can affect covariates. For example, a competing dependent data can affect a dependent data by increasing or decreasing the product's dependent data.

Processing logic can equivalently use other forecast models known in the art. For example, in one embodiment, processing logic uses a model (Equation (4)) that is a sum of five models related to the five in-store grocery merchandising conditions used in the US:

$$\text{Volume}_{total} = \text{Volume}_{DispFeat} + \text{Volume}_{Display} + \text{Volume}_{Feature} + \text{Volume}_{TPR} + \text{Volume}_{NoPromo} \quad (4)$$

where $\text{Volume}_{DispFeat}$ is the volume due to a product offered with a feature advertisement and display, $\text{Volume}_{Display}$ is the volume due to the product offered with a display but no feature advertisement, $\text{Volume}_{feature}$ is the volume due to the product offered with a feature advertisement but no display, $\text{Volume}_{TPR}$ is the volume due to the product offered with a temporary price reduction (TPR), and $\text{Volume}_{featrure}$ is the volume due to the product offered no display, feature advertising or TPR. Each volume equation has its own intercept, coefficients, and covariates as follows:

$$Volume_{DispFeat} = \alpha + \beta_1 ACV_{DispFeat} + \sum_{i=2}^{5} \beta_i x_i \quad (5)$$

$$Volume_{Display} = \alpha + \beta_2 ACV_{Display} + \beta_1 x_1 + \sum_{i=2}^{5} \beta_i x_i$$

$$Volume_{Feature} = \alpha + \beta_3 ACV_{Feature} + \sum_{i=1}^{2} \beta_i x_i + \sum_{i=4}^{5} \beta_i x_i$$

$$Volume_{TPR} = \alpha + \beta_4 ACV_{TPR} + \beta_5 x_5 + \sum_{i=1}^{3} \beta_i x_i$$

$$Volume_{NoPromo} = \alpha + \beta_5 ACV_{NoPromo} + \sum_{i=1}^{4} \beta_i x_i$$

where $\beta_1$, $\beta_2$, $\beta_3$, $\beta_4$, and $\beta_5$ are coefficients for other covariates and typically are the same (e.g. weather, price, etc.) for the five sub-volume equations in Equation (5).

At block 206, processing logic determines whether to use predicted causal data or historical causal data. If processing logic uses historical causal data, processing logic generates predicted historical dependent data at block 214. On the other hand, if processing logic uses predicted causal data, processing logic creates predicted causal data, at block 208. The predicted causal data represents the information affecting predicted future dependent data. The predicted causal data is typically the same type of information as for historical causal data 104, such as in-store activities, advertising, weather, competitive activity, etc. In one embodiment, processing logic generates the predicted causal data from the historical causal information. In this embodiment, the same values used for in-store activities, advertising, etc., from a similar time period in the past are used for a time period in the future. For example, processing logic uses the same historical causal data for a product from March 2005 for the predicted causal data in March 2006 is used. In another embodiment, processing logic uses the same historical causal information for the predicted causal information, but processing logic makes a change to some or all of historical causal data. For example, processing logic uses the same historical causal data from March 2004 plus an overall three percent (3%) increase for the predicted causal data in March 2006. As another example, processing logic uses the same historical causal data but decreases all marketing business drivers by five percent (5%). In a still further example, processing logic uses the same historical causal data, but predicts for an unusually warm summer. In a further embodiment, processing logic generates the predicted causal data from a market researcher's input. In another embodiment, processing logic generates the predicted causal data from another product's historical causal data. In another embodiment, processing logic generates the predicted causal data from a combination of the ways describe above.

FIG. 3A is a block diagram illustrating one embodiment of process 200 that derives predicted causal data 302 from historical causal data 104 as described in FIG. 2 at block 204. In FIG. 3A, historical actual dependent data 102 and historical causal data 104 are collected as in FIGS. 1A-B. As in FIGS. 1A-B, the three dimensions of actual dependent data cube 102 are time, products and locations. Actual historical dependent data 102 and historical causal data 104 end at a specified time 108, while the left of actual historical dependent data 102 and historical causal data 104 represent the earliest dependent data available.

To the right of time 108, the timeline 304 progresses into the future. Predicted causal data 302 starts at a specified time 108 and progresses to the right into the future. As stated above, the predicted causal data 302 is copied from the historical causal data 104, derived from the historical causal data 104, derived from some other product causal data, generated from user input or a combination thereof. This embodiment is meant to be an illustration of predicted causal data 304 and does not imply that predicted causal data 304 always starts at present time 108. Other embodiments of predicted causal data 304 can be for any future time period and of varying length, such as a days, weeks, months, years, etc. Furthermore, actual causal data 104 and predicted causal data 302 can have different time lengths.

Returning to FIG. 2, at block 210, processing logic determines if the analyst modified the predicted causal data. If so, at block 212, processing logic processes the market researcher's changes to the predicted causal data. Examples of possible modifications to the predicted causal data include, but not limited to, having more/less television advertising as compared with a previous time period, anticipating hotter/cooler weather, raising/lowering the price, etc. In either case, processing logic proceeds to block 214.

At block 214, processing logic generates predicted dependent data from the forecast model and either the historical or predicted causal data. In one embodiment, processing logic generates predicted historical dependent data using historical causal data. Alternatively, processing logic generates predicted future dependent data using predicted causal data.

In one embodiment, processing logic generates the predicted dependent data with the same granularity as the historical dependent data. As an example of dependent data prediction and by way of illustration, assume processing logic uses the simple forecast model in Equation (2). Further assume that business drivers and coefficients have the following values as listed in Table 1

TABLE 1

Sample business drivers and coefficients.

| Business Drivers | Values | Coefficients | Values |
|---|---|---|---|
| Display | 20 | $\beta_{Display}$ | 3.2 |
| Feature (Ad) | 80 | $\beta_{Ad}$ | 0.11 |
| Price | $ 2.49 | $\beta_{Price}$ | −1.6 |
| TV | 0.3 | $\beta_{TV}$ | 20 |
| Weather | 72 | $\beta_{Weather}$ | 0.13 |

Figure 6:
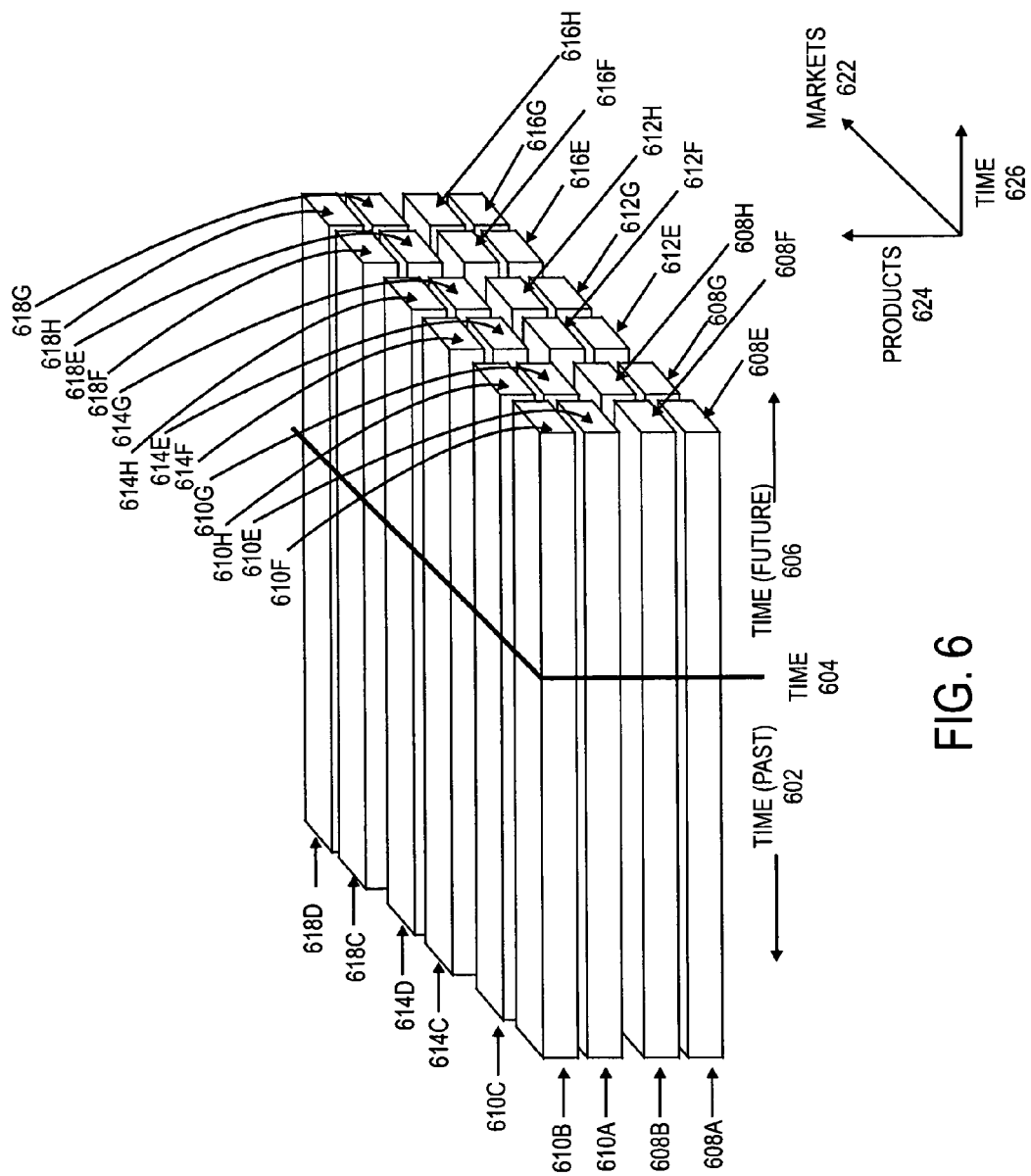
FIG. 6 is a block diagram illustrating one embodiment of multiple dependent data and causal data.

Using the forecast model in Equation (2), processing logic predicts a dependent data of 86.7. If the price were to decrease to $1.99, then the predicted dependent data rises to 87.5. Although this is a simple example, forecast models are typically more complicated involving numerous business drivers and multiple product dependencies. For example, as shown in FIG. 6, below, processing logic can model thousands of products in hundreds of markets over as many as a hundred weeks.

FIG. 3B is a block diagram illustrating one embodiment of process 200 that derives predicted dependent data 306 from predicted causal data 302 by using forecast model 308 as described in FIG. 2 at block 212. In FIG. 3B, historical actual dependent data 102 and historical causal data 102 is collected as in FIGS. 1A-B. The three dimensions of actual dependent data cube 102, historical causal data 104, predicted causal data 302 and predicted dependent data 306 are time, products and locations. Actual historical dependent data 102 and historical causal data 104 end at a specified time 108, while the left of actual historical dependent data 102 and historical causal data 104 represent the earliest dependent data available. As in FIG. 3A, the left of predicted causal data is time 108 or the beginning of predicted causal data 302. Furthermore, processing logic generates predicted dependent data 306 using predicted causal data 302 and forecast model 308. Like predicted causal data 302, predicted dependent data 306 starts to the left of time 108 and progresses into the future via timeline 304. This embodiment is meant to be an illustration of predicted dependent data 306 and does not imply that predicted dependent data 306 always starts at time 108. Other embodiments of predicted dependent data 306 can be for any time period in the future and of varying length, such as a day, week, month, year, etc. Furthermore, predicted dependent data 306 and predicted causal data 302 can have different time lengths or represent overlapping time periods.

Returning to FIG. 2, at block 216, processing logic derives analytical reports from the predicted dependent data. Processing logic can generate the analytical reports from predicted historical dependent data and/or predicted future dependent data. Because the granularity for each of the sets of predicted dependent data is the same, processing logic can generate the same types of analytical reports. Processing logic typically generates dependent data decomposition reports, "due-to" reports and scenario simulations or optimizations. These reports provide derived information from the dependent data (e.g., revenue, costs, etc.), causal data contribution to the dependent data (e.g., percent volume change caused by price, advertising, weather fluctuations, etc.) and/or combinations thereof (incremental revenue changes due to advertising, price, etc.). In addition, processing logic generates financial information reports from the predicted dependent data, such as profit and loss statements that include revenue, costs, and operating profit from a manufacturer and distributor standpoints. Generation of analytical reports is further described in FIG. 7, below.

Figure 4:
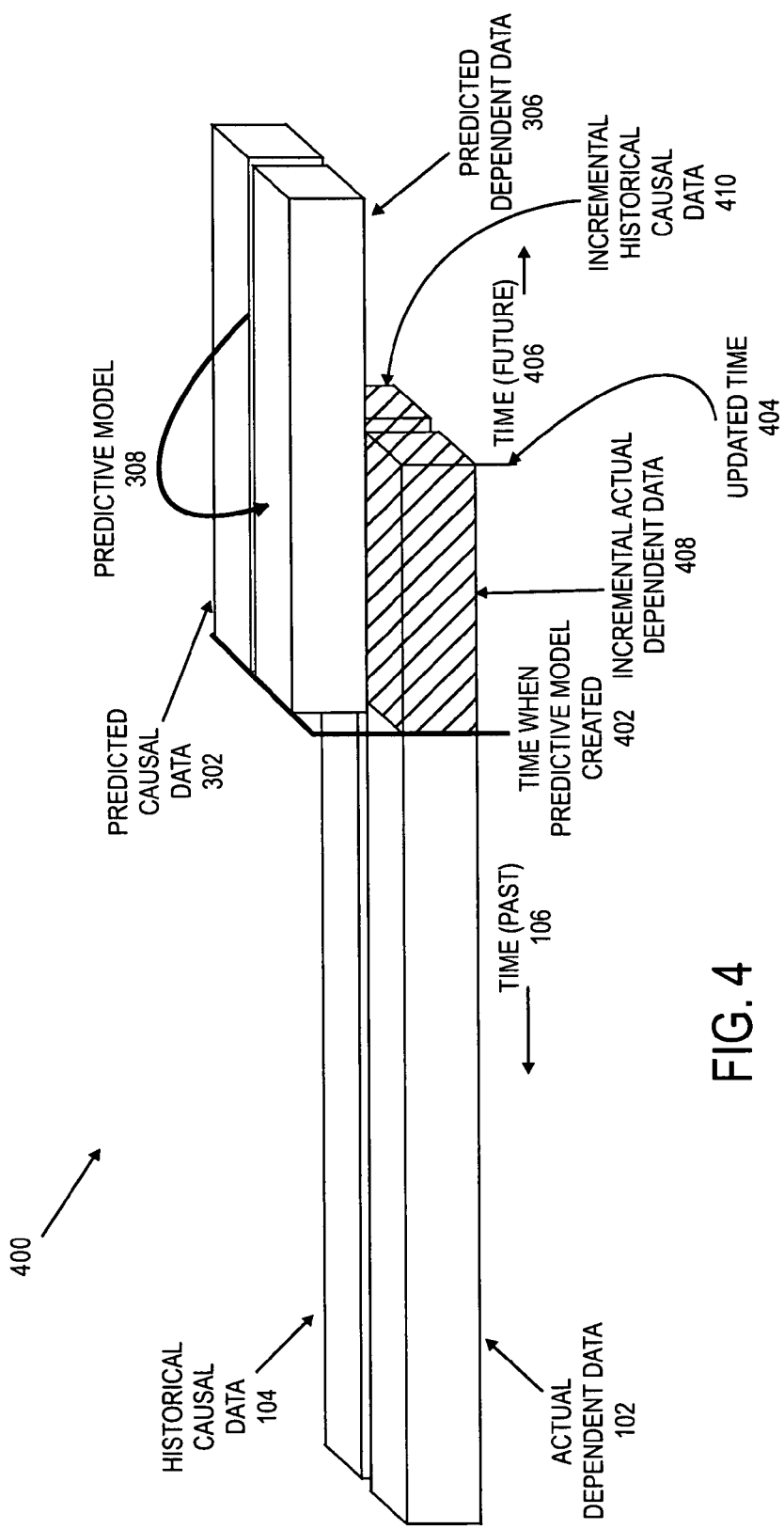
FIG. 4 is a block diagram illustrating one embodiment that compares predicted dependent data and incremental historical dependent data.
Figure 5:
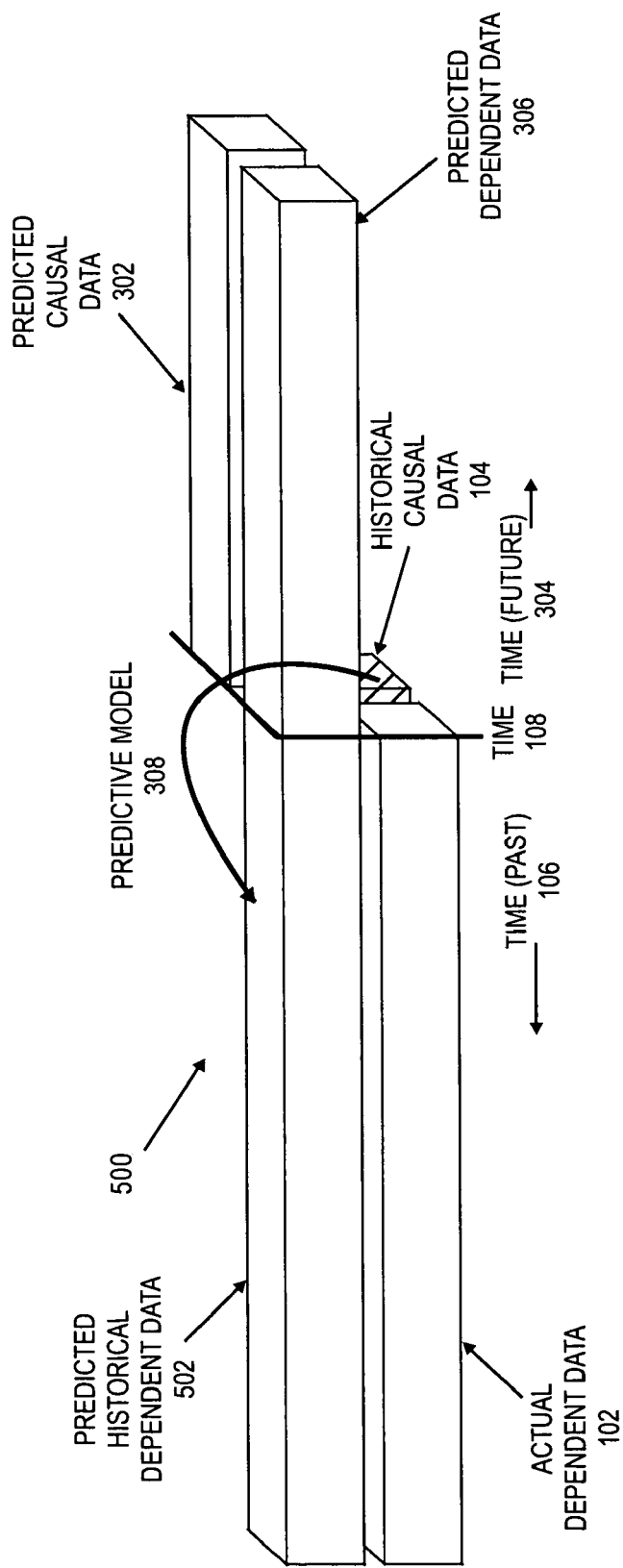
FIG. 5 is a block diagram illustrating one embodiment that generates predicted dependent data.

At block 218, processing logic determines if the forecast model should be validated. Although in one embodiment the analyst signals to the processing logic that the model should be validated, alternate embodiments may determine whether a model should be validated by different means (i.e., processing logic automatically determine whether the model should be validated, processing logic determines whether model should be validated with input from the analyst, etc.) If so, at block 220, processing logic validates the forecast model by comparing predicted historical dependent data information with actual historical dependent data information. Processing logic can compare with the actual historical dependent data in two ways: (i) accruing additional actual dependent data and comparing the additional historical dependent data with the predicted dependent data as shown in FIG. 4 below or (ii) predicting historical dependent data information using the forecast model and comparing the predicted historical dependent data information with the existing actual historical dependent data as shown in FIG. 5 below. Once the dependent data used in the comparison is generated or collected, processing logic compares the two sets of dependent data information using one of many known schemes to compare dependent data, such as, but not limited to variance analysis, holdout sample, model statistics, etc. A close comparison between the dependent data sets indicates the forecast model is a valid representation of dependent data. However, if the dependent data sets vary quite markedly, the forecast model should be changed or updated.

FIG. 4 is a block diagram illustrating one embodiment of process 200 that compares predicted dependent data information 306 with the accrued historical dependent data information 408 as described in FIG. 2 at block 216. As in FIG. 3B, FIG. 4 illustrates actual historical dependent data 102 and historical causal data 104 as time evolving cubes ending at time 402. Furthermore, FIG. 4 illustrates predicted dependent data 306 and predicted causal data 302 starting at time 402. Processing logic uses forecast model 308 to generate the predicted dependent data 306 from the predicted causal data 302. In addition, FIG. 4 illustrates accrual of additional incremental actual dependent data 408 and incremental causal data 410 because time has evolved from time 402 when the causal data was first predicted 402 to an updated present time 404. To the left of updated present time is the historical timeline 412 and to the right is the future timeline 404. Because time has evolved, additional dependent data and causal data can be collected and is represented as incremental actual dependent data 408 and increment causal data 410. Incremental actual dependent data 408 is compared with the same portion of predicted dependent data 306 to determine if forecast model 308 is reliable.

FIG. 5 is a block diagram illustrating one embodiment of process 200 that compares predicted dependent data 306 and predicted historical dependent data information 502 as described in FIG. 2 at block 216. As in FIG. 3B, FIG. 5 illustrates actual historical dependent data 102 and historical causal data 104 as time evolving cubes ending at the present time 108. Furthermore, FIG. 5 illustrates predicted dependent data 306 and predicted causal data 302 starting at present time 108. In addition, FIG. 5 illustrates processing logic generating predicted historical dependent data 502 from historical causal data 104 using forecast model 308. Predicted historical dependent data 502 is different from predicted historical dependent data 110 because predicted historical dependent data 502 has the same granularity as historical causal data 104. Processing logic uses the predicted historical dependent data 502 to validate forecast model 308 as described further at block 216 above.

Process 200 offers a powerful way to predict future dependent data and gain insight to the business drivers that predominantly affect the predicted dependent data. Because processing logic uses the full granularity of actual historical dependent data 102 and historical causal data 104 and propagates this granularity into the predicted causal data 302, predicted dependent data 306 and predicted historical dependent data 502, processing logic can calculate the analytical reports at any level of granularity supported by the underlying data. Thus, unlike traditional OLAP, processing logic allows an analyst the capability to calculate affects to the dependent data at a very low level of granularity, by marketing variable, for example. In addition, processing logic allows analytical reports based on predicted future dependent data. This is advantageous because future predictions of dependent data is performed on a set of granular dependent data and not based on predictions from aggregated historical data as with OLAP. Furthermore, process 200 allows an analyst the ability to calculate contributions to dependent data (e.g. volume changes) and data computed from dependent data (e.g. revenue changes). In addition, an analyst can still make inferences and/or speculations based on the predicted historical and/or future dependent data.

Figure 3:
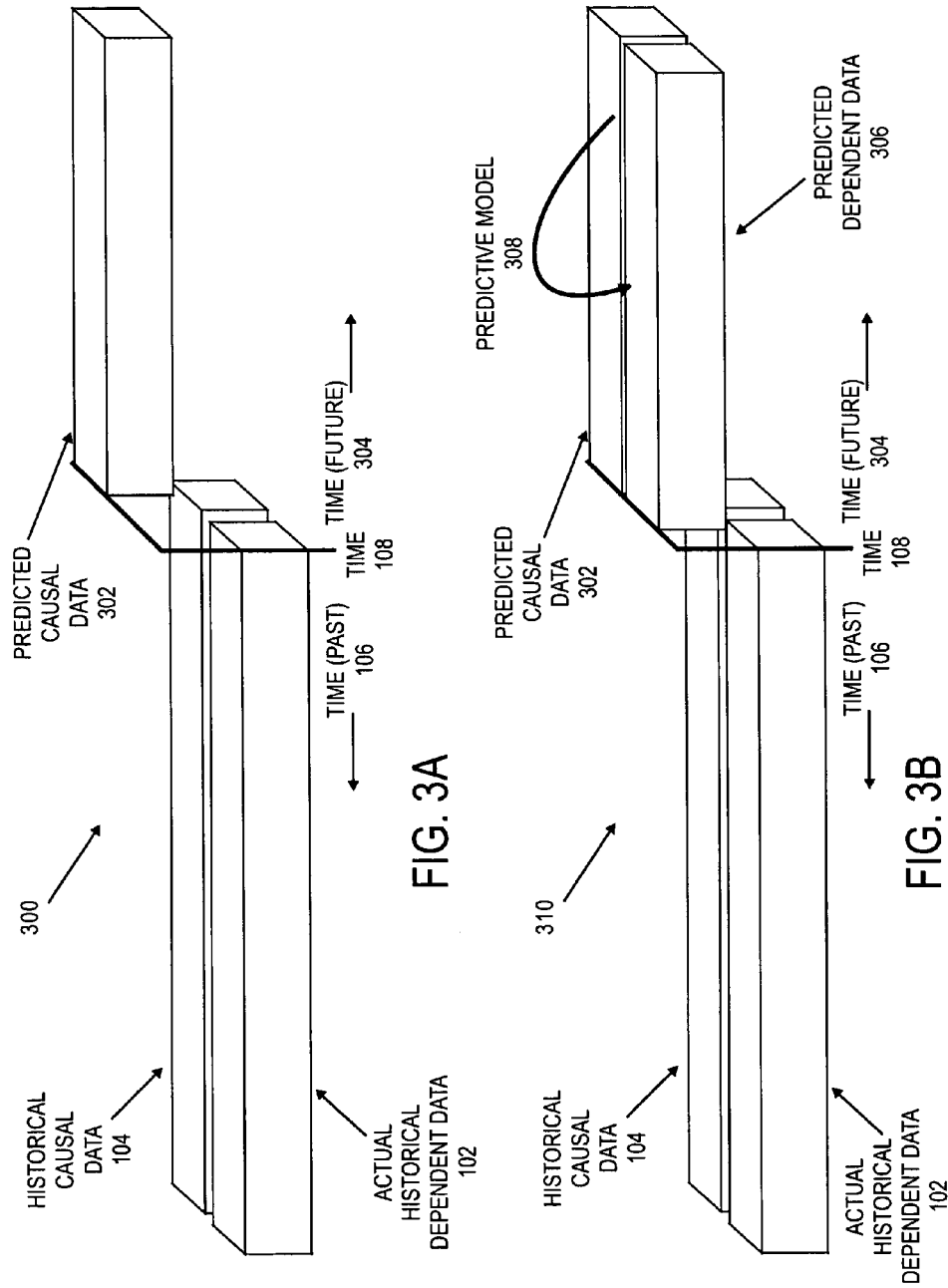
FIG. 3A is a block diagram illustrating one embodiment of deriving predicted causal data from historical causal data.
FIG. 3B is a block diagram illustrating one embodiment of deriving predicted dependent data from predicted causal data.

FIG. 6 is a block diagram illustrating one embodiment 600 generating predicted causal and dependent data information for multiple products and markets. FIGS. 3-5 illustrate various cubes of actual and predicted data for one product and market. Typically, market planning must span multiple products (often thousands), in multiple markets (hundreds) for many weeks (often 100 weeks or more). FIG. 6 illustrates multiple sets of product cubes (608-618). Within each product cube set, there are eight distinct cubes as listed in Table 2.

TABLE 2

FIG. 6 cube types.

| Figure Label | Cube Type |
|---|---|
| A | Actual Historical Dependent data |
| B | Predicted Historical Dependent data |
| C | Actual Historical Causal data |
| D | Predicted Historical Causal data |
| E | Actual Future Dependent data |
| F | Predicted Future Dependent data |
| G | Actual Future Causal data |
| H | Predicted Future Causal data |

All eight cube types are present in FIG. 6, although not every cube type for every product 608-618 is visible in FIG. 6. Although in one embodiment, the product cubes are organized as different products 624 in the z-direction, different markets 622 in the y-direction and time changing in the x-direction, alternate embodiments may organize the product cubes in a different fashion (e.g., using different marketing variables, having multiple cubes for different hierarchies of products and/or markets, etc.).

Figure 7:
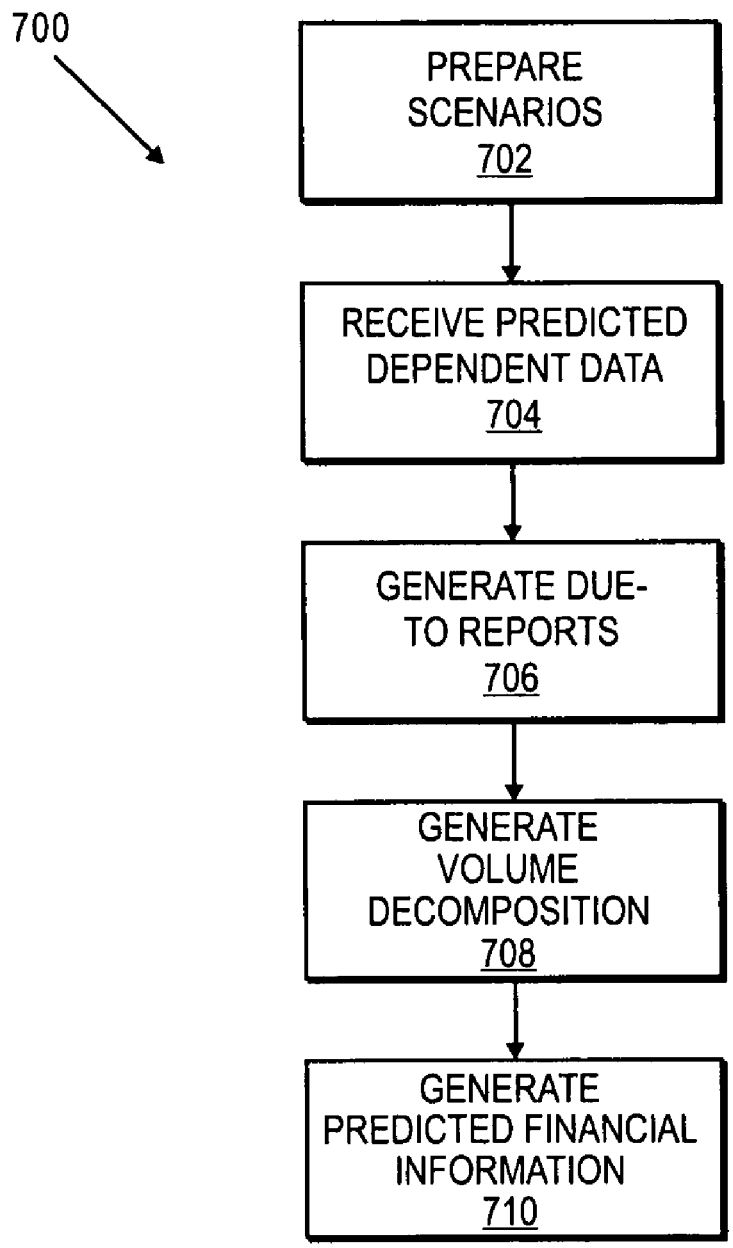
FIG. 7 is a flow diagram of one embodiment of a process for generating analytical reports from the predicted dependent data.

FIG. 7 is a flow diagram of one embodiment of a process 700 to generate analytical reports from the predicted dependent data information. The process may be performed by processing logic that may comprise hardware (e.g., circuitry, dedicated logic, programmable logic, microcode, etc.), software (such as run on a general purpose computer system or a dedicated machine), or a combination of both. In one embodiment, process 700 is performed by data processing system 800 of FIG. 8.

Returning to FIG. 7, at block 702, process 700 begins with processing logic preparing scenarios based on the market researcher's input. A scenario is a set of assumptions and predicted outcomes to a particular business question. For example, in one embodiment, the business question would be: "What would the revenue change be if there was a three percent (3%) product price increase in the Northeast?" Processing logic receives the set of assumptions (three percent price increase, restriction to Northeast market location) and computes the resulting revenue change. Thus, a scenario allows an analyst the capability to determine causal data contributions to data computed from dependent data. Scenarios are a central unit of analysis for market planning and are used to compare expected outcomes under different marketing conditions. During a typical process, there can be dozens or hundreds of scenarios created.

At block 704, processing logic receives the predicted dependent data information. Processing logic uses this information plus other product information such as raw goods costs, manufacturing costs, distribution costs, etc. to generate the analytical reports. At block 706, processing logic calculates due-to reports. A due-to report identifies the amount of dependent data that is due to a specific business driver. Processing logic uses the scenario or a time period as a baseline for the due-to report. Processing logic manipulates the marketing business drivers to determine the dependent data contribution for each marketing business driver. For business drivers that have linear effects to the dependent data, processing logic manipulates that specific business driver to determine the dependent data change. For business drivers that have a non-linear effect and is dependent on other business drivers, processing logic manipulate the specific business driver along with the dependent business drivers to determine a dependent data contribution attributable to each business driver.

At block 708, processing logic generates a volume decomposition report. Similar to the due-to reports, the volume decomposition reports identifies the amount of dependent data that is due to marketing business drivers. The volume decomposition report is a special case of the due-to report. Processing logic starts from a known point where all marketing business drivers have zero contribution and varies the marketing business drivers to determine the volume contributions from each marketing business driver. Thus, processing logic calculates a baseline that represents no marketing activity. Relating back to the forecast model from block 212 in FIG. 2, processing logic calculates a volume from the forecast model that has zero contribution from marketing activities (e.g. no TV or print advertising). Similar to the due-to reports, processing logic takes account of linear and non-linear effects. Both due-to and volume decomposition reports offer an analyst the capability to determine causal data contributions to dependent data.

At block 710, processing logic generates predicted financial information, typically in the form of a profit and loss statement that utilizes the predicted volume information from a scenario. In one embodiment, processing logic generates a profit and loss statement that includes gross revenue, cost of goods sold, net revenue, gross profit, contribution and operating income. Processing logic calculates the cost from fixed costs (i.e., overhead), variable costs (e.g., raw materials, packaging, etc.) and business driver costs (e.g., advertising costs, etc.). Because processing logic generates the financial information from the predicted volume information, processing logic generates the financial information based on the finest level of granularity available. This allows flexibility in analyzing the result and permits drilling down in the results to examine, for example, a market or financial contribution more closely.

Figure 8:
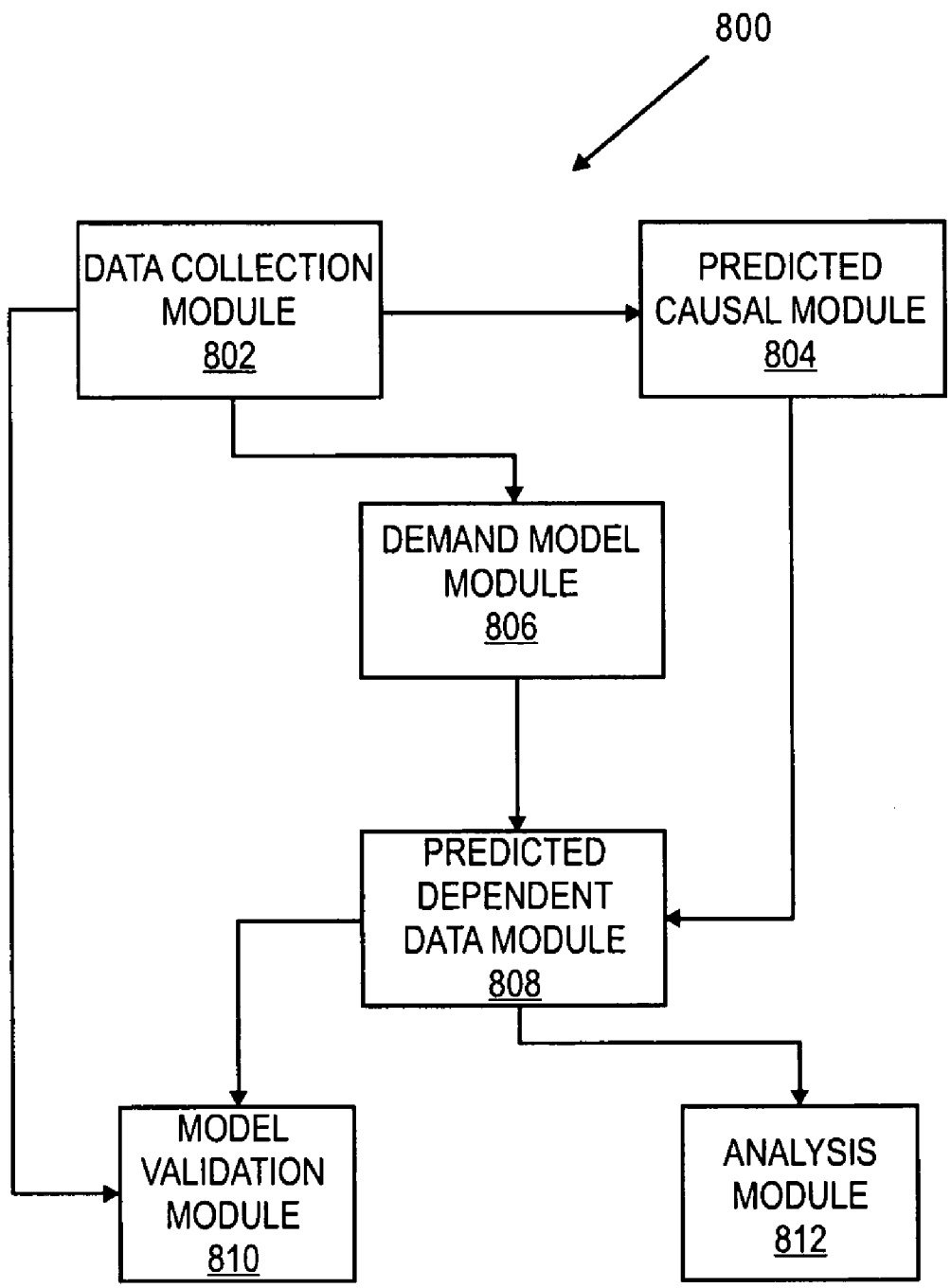
FIG. 8 is a block diagram of one embodiment of a data processing system that generates predicted dependent data.

FIG. 8 is a block diagram of a data processing system 800 that generates predicted dependent data according to one embodiment of the invention. Data processing system can be, but not limited to, a general-purpose computer, a multi-processor computer, several computers coupled by a network, etc. In FIG. 8, system 800 collects the actual historical dependent data and the historical causal data in the data collection module 802. Data collection module 802 collects the information from a local computer, one or more remote computers or a combination of local and remote computers. In this embodiment and referring back to FIG. 2, data collection module 802 performs the function contained in block 202. Returning to FIG. 8, data collection module 802 forwards the historical causal information to predicted causal module 804.

Predicted causal module 804 processes the historical causal data and generates the predicted causal data by simply using the historical causal data from the same relative time period, applying changes to the corresponding historical causal data (e.g. add three percent to marketing business drivers), using historical causal data from another product and/or allowing the analyst to input the information. Referring back to FIG. 1, predicted causal module 804 performs the functions in blocks 206-212.

Returning to FIG. 8, forecast model module 806 uses the historical causal data from data collection module 802 to generate the forecast model. As stated above the forecast model is mathematical model that can be based on intercepts, coefficients and covariates, where the covariates relate to the business drivers. Referring back to FIG. 2, forecast model module performs the functions of block 204.

Returning to FIG. 8, predicted dependent data module 808 uses the forecast model generated by forecast model module 806, the data from the forecast causal model 804, and/or the data from the data collection module 802 to calculate the predicted dependent data. Furthermore, predicted dependent data model 808 can predict historical dependent data that can be used by model validation module 810 to validate the forecast model. Referring back to FIG. 2, forecast model module performs the function of block 214.

Returning to FIG. 8, model validation module 810 validates the forecast model by either comparing predicted historical dependent data with the actual historical dependent data or accruing additional actual historical dependent data and comparing it with the predicted dependent data. Forecast model validation 810 uses many processes known in the state of the art to do the comparison of actual and predicted historical dependent data information, such as, but not limited to, variance analysis, holdout sample, model statistics, etc. Referring back to back to FIG. 2, forecast model validation module 810 performs the functions in blocks 218-220. The model validation module may also perform the function of block 1005 in FIG. 10, as later described.

Returning to FIG. 8, analysis module 812 generates analytical reports from the predicted dependent data information by generating due-to reports, volume decompositions, scenarios, and financial analysis such as profit and loss statements. Referring back to FIGS. 2 and 7, analysis module 808 performs the functions at block 216 and blocks 702-710.

Updating the Forecast Model

Figure 9:
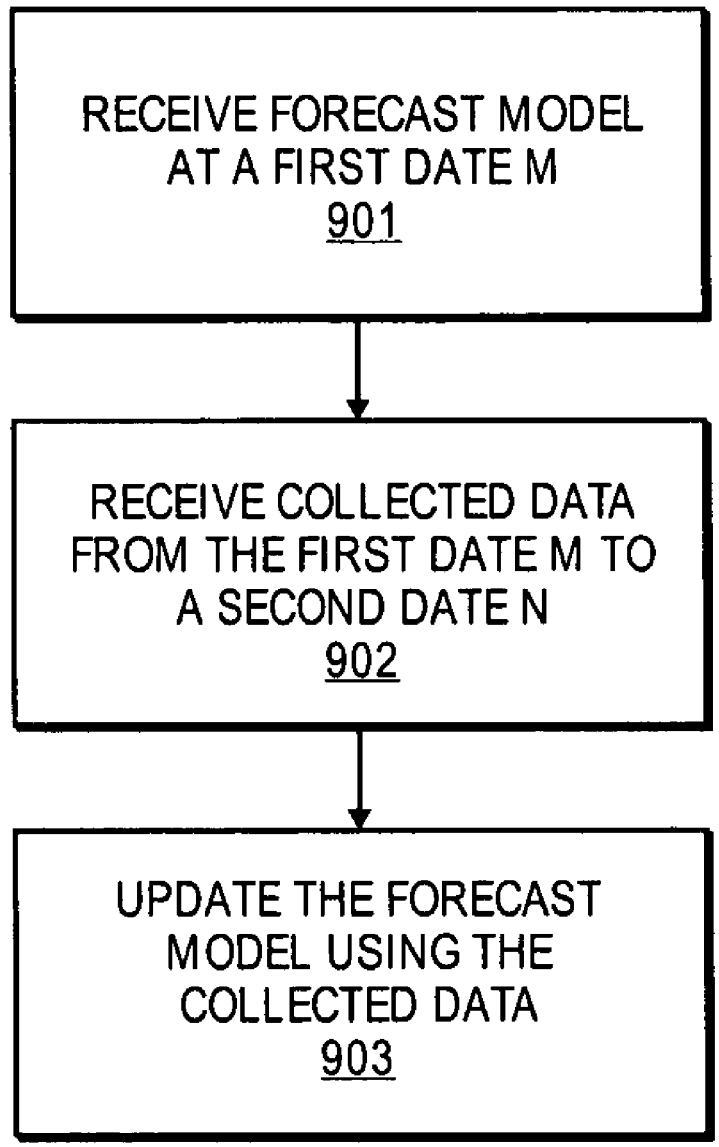
FIG. 9 is a block diagram of one embodiment of updating a forecast model.

FIG. 9 is a block diagram of a method for updating the forecast model. In one embodiment, testing and validation during the update of a forecast model is provided by the system described in FIG. 8. At 901, an original forecast model created on a date M is received by the system or apparatus that is to update the forecast model. In one example, the forecast model is retrieved from memory or a storage location (e.g., optical storage disk, magnetic storage disk, flash memory). In an alternate embodiment, the forecast model is inputted by a user through a user interface of the system.

At 902, the system receives collected data from date M to a subsequent date N. The types of data that are collected include, but are not limited to, causal data and dependent data future to date M. The types of causal and dependent data that are collected are previously described in relation to FIG. 1A. The forecast model created on date M is to analyze or forecast at least a subset of the dependent data collected in 902. The forecast model also analyzes or forecasts updates in data that is a part of a dimension other than time. Examples of such dimensions include, but are not limited to, products (e.g., data is received on a new drink by Coca-Cola® and thus data collected/created up to reference M is the data on the original products and data collected/created up to reference N includes the data of M and the data on the new product) and locations (e.g., data is received on a new sales market Coca-Cola® has entered and thus the data collected/created up to reference M is the data on the original markets and the data collected/created up to reference N includes the data of M and the data on the new market). Purely for purposes of explanation, the method illustrated in FIG. 9 is described in reference to data collected for the dimension of time.

Referring back to FIG. 9, the original forecast model is updated at 903. In updating the forecast model, the collected data from 902 is used to test any modified or updated forecast model, as will be described in FIG. 10, one embodiment of method block 903.

Figure 10:
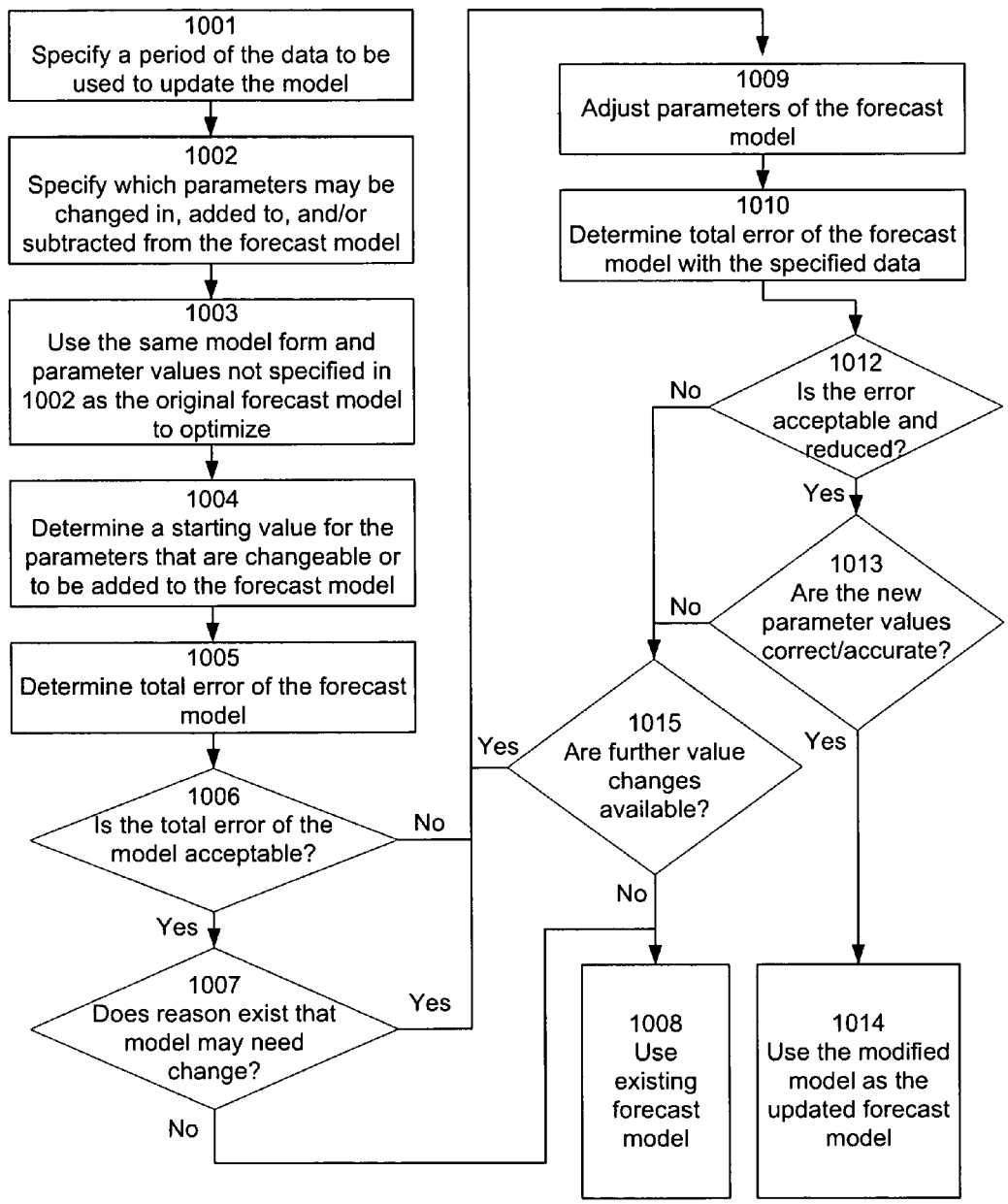
FIG. 10 is a block diagram of an example method of 903 from FIG. 9.

FIG. 10 is a block diagram of one embodiment of method block 903 from FIG. 9. At 1001, a period of time of the data collected to be used to update the forecast model is specified. For example, from the data collected in 902 of FIG. 9, only the last 4 months of the collected data may be used to update the forecast model. In the specific example of Coca-Cola® advertising in video games, the last four months of collected data is used to update the model if Coca-Cola® began advertising in video games exactly four months before date N. Alternatively, all collected data may be used to update the forecast model. The period of time is specified by a user or determined by the system. In addition, the specified period of time is not necessarily exclusive in updating and testing the forecast model (e.g., other data may be used to test the updated forecast model or confirm the results of the reliability of the updated model).

Referring back to FIG. 10, at least one parameter that is allowed to be added to the forecast model, subtracted from the forecast model, or changed in the forecast model is specified in 1002. The parameters include, but are not limited to, coefficients, covariates, baselines/intersections, and any other variables that exist in the forecast model. In one embodiment, the parameter(s) are limited to the coefficients of the forecast model or of the terms to be added to the forecast model. Therefore, if above Equation (2) is the forecast model received in 901 of FIG. 9, the parameters are coefficients $\beta_i$.

Furthering the example that Equation (2) is the forecast model created on date M and Coca-Cola® wishes to analyze the effects of advertising in video games, a term $\beta_{n+1}x_{n+1}$ is to be added to Equation (2). Term $\beta_{n+1}x_{n+1}$ is the coefficient and covariate describing advertising in video games' effect on volume. Alternatively or in addition, $\beta_{Ad}$ is the coefficient to be changed if advertising in video games is assumed to be apart of conventional media advertising. Just as terms may be added to and parameters may be changed in the forecast model, terms may be removed from the forecast model. For example, if display advertising is perceived to begin having minimal effect on change in volume, then the term is specified to be removed from the forecast model.

Referring back to FIG. 10, a range of values may also be specified in 1002 for each of the parameters identified. For example, if Coca-Cola® believes that a particular parameter's coefficient will not change by more than 50%, then the coefficient identified as being changeable has a specified range so that the maximum value would be equivalent to the current coefficient, plus or minus 50% of the original coefficient value. The range is specified by a user or determined by the system. Alternatively, the range of values that the parameter(s) may equal is left open.

In 1003, the form of the model and the values of the parameters not identified in 1002 are used as the template forecast model in updating the original forecast model. For example, if $\beta_{Ad}$ is identified as the parameter to be changed in 1002 where Equation (2) is the original forecast model, then all of the terms and values specified in Equation (2), except for $\beta_{Ad}$, are kept the same when modifying the forecast model to update the original model.

In 1004, a starting value for the parameters identified in 1002 to be changed in or added to the original forecast model is determined. In one embodiment, the starting value of a parameter is the parameters' existing value in the original forecast model. For a parameter identified to be added to the forecast model, the parameter is set to a default value and the relevant term(s) is/are added to the forecast model (e.g., $\beta_{n+1}x_{n+1}$ is added to the forecast model Equation (2) in the above example and the coefficient $\beta_{n+1}$ is set to a default value, such as zero). Parameter values may also be specified by a user or a best estimate as to the optimum value for a parameter by the system.

With all parameters in the forecast model being set to an initial value, the total error of the forecast model is determined in 1005. In determining the error of the forecast model, the error is quantified by the difference between the predicted output value of the forecast model and the observed actual value. For example, when determining the error of Equation (2) in updating the forecast model for Coca-Cola®, the collected data from 902 is inserted into Equation (2) in order to produce a predicted Volume value G at some point in time from date M to date N. The collected data also includes the actual observed Volume value H for the same point in time. The error is then determined to be a quantification of the difference between values G and H (i.e., the difference between the predicted result and the actual result).

Since error values may differ over different periods of time, many errors over multiple periods of time may be calculated in determining a total error. As a result, an objective function quantifying the total error of a forecast model is created and thus minimized during updating the forecast model. A simplified example of an error model is illustrated in Equation (6):

$$Error_{Total} = \sum_{i=1}^{n} Error_i^2 \quad (6)$$

where $\beta_i$ is the coefficient to independently weight each $Error_i$ separately and $Error_i$ is the error of the forecast model for a specified time period within date M to date N, where each time period from i=1 to n is different from all other time periods. If Equation (6) is the actual equation to determine the total error, Equation (6) would be solved for the total error in 1005. As with the forecast model update, the total error objective function may also be calculated in reference to any dimension other than time.

In decision block 1006, the system determines if the total error of the forecast model is acceptable. The total error is acceptable if the error is below a specified threshold. The threshold is either defined by a user or set to a default value. For example, if a user for the system updating the forecast model for Coca-Cola® sets the threshold level of error to be 0.8, then a modified forecast model with a 0.78 level of confidence has an error level that is acceptable in 1006. In the previous example, the threshold may also be defined as a relationship to the total error of the original forecast model (e.g., half the total error value of the original forecast model).

If the total error is acceptable in 1006, then the system determines if there is an external reason to believe the forecast model's parameter values need to be changed in 1007. That there exists a reason is specified by the user or determined by the system through collected data or past performance of the model. Examples of an external reason include as in the example of Coca-Cola® include, but are not limited to, the launch of a new advertising campaign, closing of a major super-market chain, sustained heat waves, and introduction of a new competitor. If no external reasons exist in 1007, then the existing (original) model is not updated, and the existing forecast model continues to be used in 1008.

If the total error of the forecast model is not acceptable in 1006 or an external reason exists to believe the forecast model's parameter values need to be changed in 1007, the parameters identified in 1002 are changed and/or terms with identified parameters are added or subtracted from the forecast model in 1009. The changes to be made to the parameter values in the forecast model in 1009 are determined by attempting to minimize an objective function for total error through varying the parameters identified as being added, removable, and/or changeable. Any optimization or statistical model estimation technique may be used in determining the new values of the parameters in 1009.

Once the forecast model is modified, the total error of the forecast model is determined using the data specified in 1001. The error is determined in 1010 as it is determined in 1005. One difference, though, may be that the data used to determine the error is different (e.g., determining the error in 1005 uses all or the original data {data collected before date M} while determining the error in 1010 uses the data specified in 1001).

Once the error is determined in 1010, the system determines if the error is acceptable and reduced in 1012. Determining if the error is acceptable is the same method as in 1006. In determining that the error is reduced, the system determines if the error of the modified forecast model is lower than the error of the original forecast model or, alternatively, the error of the previous modified forecast model. In addition or alternative to 1006 where the value of the total error is below a threshold is equivalent to the total error being acceptable, the system or apparatus may determine that the change in total error of the forecast model between iterations of changing the values of parameters is below a specified level of change. If a forecast model is modified multiple times (i.e., terms or added or removed and/or parameter values are changed many times) in attempting to lower the total error of the forecast model, the change in total error typically lessens as the number of iterations of modifying the forecast model increases. In a simplified example, if a forecast model is modified seven times, the total error may change from 0.20, 0.10, 0.08, 0.071, 0.0701, 0.0699, to 0.06896 over the seven iterations. While the total error is calculated as becoming smaller over time, the change in error over iterations may become so small (e.g., 0.0699 to 0.06896, a 0.00004 difference) that the improvement to the forecast model over the iteration is minimal. Therefore, if the change in total error is below a specified level over a period of time (e.g., the change in total error is negligible), then the total error of the modified forecast model is deemed as acceptable by the system or apparatus in 1012. The above method may also be used by the system in determining that the error is reduced in 1012.

If the error is reduced and acceptable in 1012, the system determines if the new parameter values are correct/accurate in 1013. Many possible parameter values are erroneous if implemented in the forecast model. For example, a negative coefficient value for the term corresponding to television advertising in Equation (2) would signify that increased spending on television advertising would have a negative effect on volume. Obviously, increased television advertising increases volume. Thus, a negative coefficient value is incorrect/inaccurate for that particular coeeficient. In another example, the inverse is true for price. A positive coefficient means a price increase alone would increase volume, which is typically not true. If the system determines that the parameter values are accurate in 1013, the system uses the modified forecast model (e.g., the recent parameter values from 1009) as the updated forecast model.

If the error is not acceptable and reduced in 1012 or the parameter values are not accurate/correct in 1013, the system determines if any further changes may be made to the values of the parameters identified in 1002 in decision block 1015. For example, if one parameter was identified in 1002 and the range specified for the parameter allowed the system to change the parameter to 60 different values, once the system changes the value of the parameter 60 times, the system would not have another change available to the parameter value without repeating a value previously analyzed. Therefore, no further value changes exist in the example. Another illustration of when further value changes are not available is when the change in error from the model incorporating previous values to the model incorporating present values is too small to be measured. If no further value changes are available for the parameters identified in 1002, the system halts attempting to update the forecast model and thus continues use of the existing (original) forecast model in 1008. If further changes to the parameter values are available in 1015, the parameter values are again changed in 1009.

In addition to the system determining if further changes are available for the parameter values, the system may also determine if a specified amount of time allotted to update the model has expired. In updating the forecast model during a time-sensitive operation, a company may only have a short amount of time to update the forecast model. Hence, a user has the option of setting a specific amount of time that the system are apparatus is allowed to attempt to update the forecast model. In another example, updating the model may include multiple iterations of changing the values of parameters of the forecast model and determining the total error. If the number of iterations becomes too large, the amount of time spent updating the forecast model may become prohibitive. Therefore, an allotted amount of time for updating the forecast model may keep the amount of time spent on updating the model within a manageable level. If the allotted amount of time to update the forecast model has expired, then further modification of the model (e.g., further changes to the values of the parameters) is halted and the existing forecast model is used in 1008.

Blocks 1009 through 1015 are repeated until decision block 1013 is answered in the affirmative or 1015 is answered in the negative. In one embodiment, blocks 1009 through 1015 are implemented through a metaheuristic algorithm, such as a genetic algorithm. Other implementations include, but are not limited to, other learning algorithms or any optimization technique. One embodiment may also be a trial and error implementation.

The methods illustrated in FIGS. 9 and 10 illustrate one method for updating a forecast model. Not all of the steps described in reference to FIGS. 9 and 10 may be required. Furthermore, while the method was described in a specific sequence of actions, the actions need not be performed in the specific order described. In addition, other actions may be included in updating the forecast model, such as saving multiple modified forecast models and ranking the forecast models with respect to the size of their total error such that more than one updated forecast model may exist. In addition, the system may have the ability to set any previous modified forecast model as the updated forecast model. Therefore, the system or apparatus may store all of the modified forecast models, one for each iteration of blocks 1009 through 1015, to later determine the best modified forecast model.

Once the updated forecast model is created, the method of FIG. 7 may be used to extract analytical data from the updated model. In one embodiment where multiple forecast models exist, the user specifies which forecast model will be used for analysis. The user is also given the choice of determining analyzing the data using all forecast models or a subset of the available forecast models. In addition, the user has the choice of determining which forecast model version has the highest level of confidence for the specific scenario. In one example, the system informs the user simply that the original forecast model is better or worse in terms of total error as compared to the updated forecast model. In addition, the system may track trends in the parameter values that may occur during the updates of forecast models. Therefore, analysis of the value of the multiple forecast models may be provided in addition to the analysis provided by the method illustrated in FIG. 7.

In practice, the forecast model may need to be updated only for specific markets. For example, Coca-Cola® advertising in video games only released in Europe should not affect dependent data from markets in other places of the world. Therefore, the system allows the user to define different levels of fidelity in updating the forecast model, from the universal forecast model down to, for example, the forecast model for Leesburg, Va. In the above example, Coca-Cola® would update the forecast model for the European market or a subset of that market (e.g., France or Germany).

The processes described herein may constitute one or more programs made up of machine-executable instructions. Describing the process with reference to the flow diagrams in FIGS. 9 and 10 enables one skilled in the art to develop such programs, including such instructions to carry out the operations (acts) represented by logical blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the processes illustrated in the flow diagrams without departing from the scope of the invention and that no particular order is implied by the arrangement of blocks shown and described herein.

Figure 11:
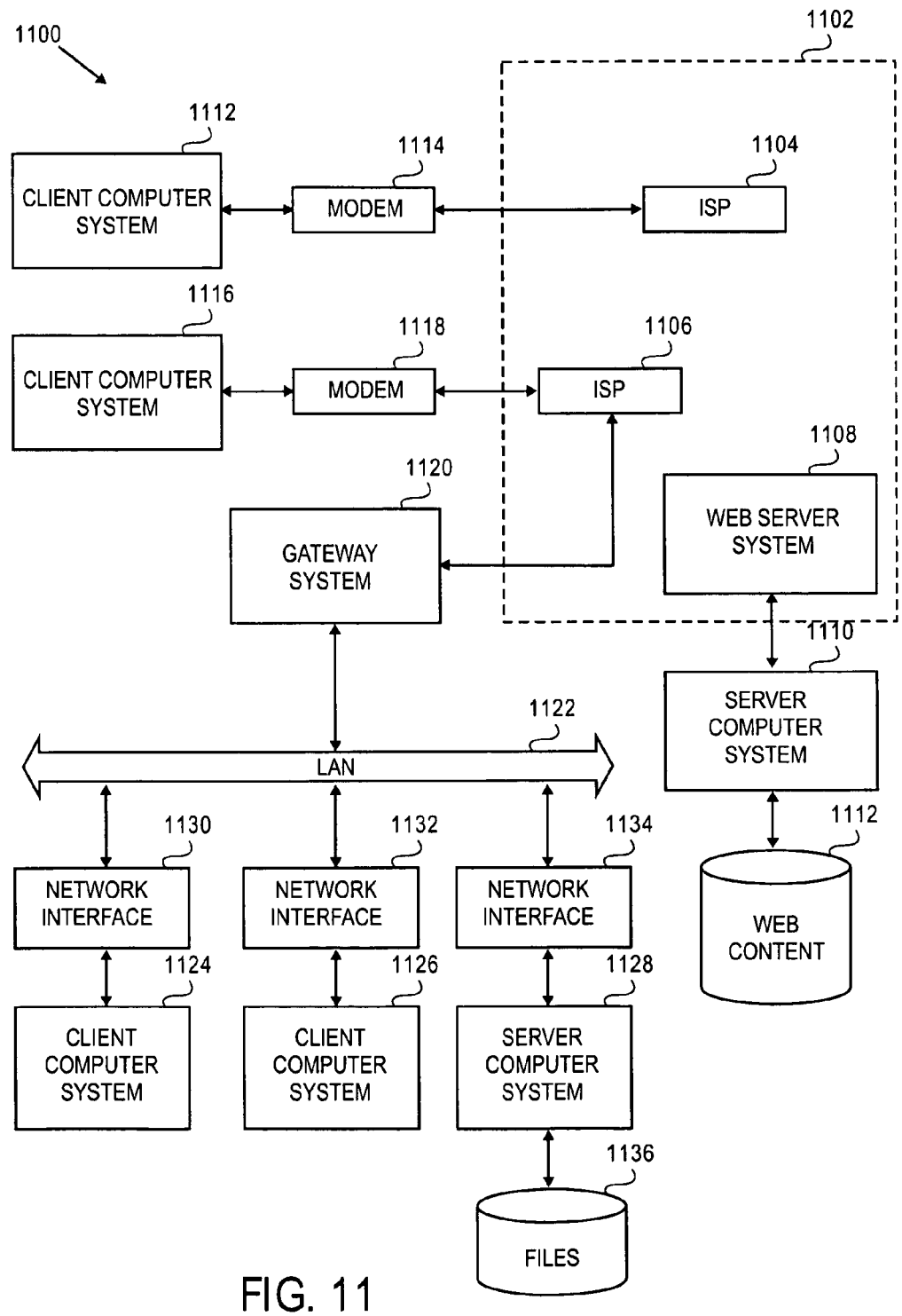
FIG. 11 is a diagram of one embodiment of an operating environment suitable for practicing the present invention.

FIG. 11 shows several computer systems 1100 that are coupled together through a network 1102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1102 is typically provided by Internet service providers (ISP), such as the ISPs 1104 and 1106. Users on client systems, such as client computer systems 1112, 1116, 1124, and 1126 obtain access to the Internet through the Internet service providers, such as ISPs 1104 and 1106. Access to the Internet allows users of the client computer systems to exchange information, receive and send e-mails, and view documents, such as documents which have been prepared in the HTML format. These documents are often provided by web servers, such as web server 1108 which is considered to be "on" the Internet. Often these web servers are provided by the ISPs, such as ISP 1104, although a computer system can be set up and connected to the Internet without that system being also an ISP as is well known in the art.

The web server 1108 is typically at least one computer system which operates as a server computer system and is configured to operate with the protocols of the World Wide Web and is coupled to the Internet. Optionally, the web server 1108 can be part of an ISP which provides access to the Internet for client systems. The web server 1108 is shown coupled to the server computer system 1110 which itself is coupled to web content 1112, which can be considered a form of a media database. It will be appreciated that while two computer systems 1108 and 1110 are shown in FIG. 11, the web server system 1108 and the server computer system 1110 can be one computer system having different software components providing the web server functionality and the server functionality provided by the server computer system 1110 which will be described further below.

Client computer systems 1112, 1116, 1124, and 1126 can each, with the appropriate web browsing software, view HTML pages provided by the web server 1108. The ISP 1104 provides Internet connectivity to the client computer system 1112 through the modem interface 1114 which can be considered part of the client computer system 1112. The client computer system can be a personal computer system, a network computer, a Web TV system, a handheld device, or other such computer system. Similarly, the ISP 1106 provides Internet connectivity for client systems 1116, 1124, and 1126, although as shown in FIG. 11, the connections are not the same for these three computer systems. Client computer system 1116 is coupled through a modem interface 1118 while client computer systems 1124 and 1126 are part of a LAN. While FIG. 11 shows the interfaces 1114 and 1118 as generically as a "modem," it will be appreciated that each of these interfaces can be an analog modem, ISDN modem, cable modem, satellite transmission interface, or other interfaces for coupling a computer system to other computer systems. Client computer systems 1124 and 1116 are coupled to a LAN 1122 through network interfaces 1130 and 1132, which can be Ethernet network or other network interfaces. The LAN 1122 is also coupled to a gateway computer system 1120 which can provide firewall and other Internet related services for the local area network. This gateway computer system 1120 is coupled to the ISP 1106 to provide Internet connectivity to the client computer systems 1124 and 1126. The gateway computer system 1120 can be a conventional server computer system. Also, the web server system 1108 can be a conventional server computer system.

Alternatively, as well-known, a server computer system 1128 can be directly coupled to the LAN 1122 through a network interface 1134 to provide files 1136 and other services to the clients 1124, 1126, without the need to connect to the Internet through the gateway system 1120. Furthermore, any combination of client systems 1112, 1116, 1124, 1126 may be connected together in a peer-to-peer network using LAN 1122, Internet 1102 or a combination as a communications medium. Generally, a peer-to-peer network distributes data across a network of multiple machines for storage and retrieval without the use of a central server or servers. Thus, each peer network node may incorporate the functions of both the client and the server described above.

Figure 12:
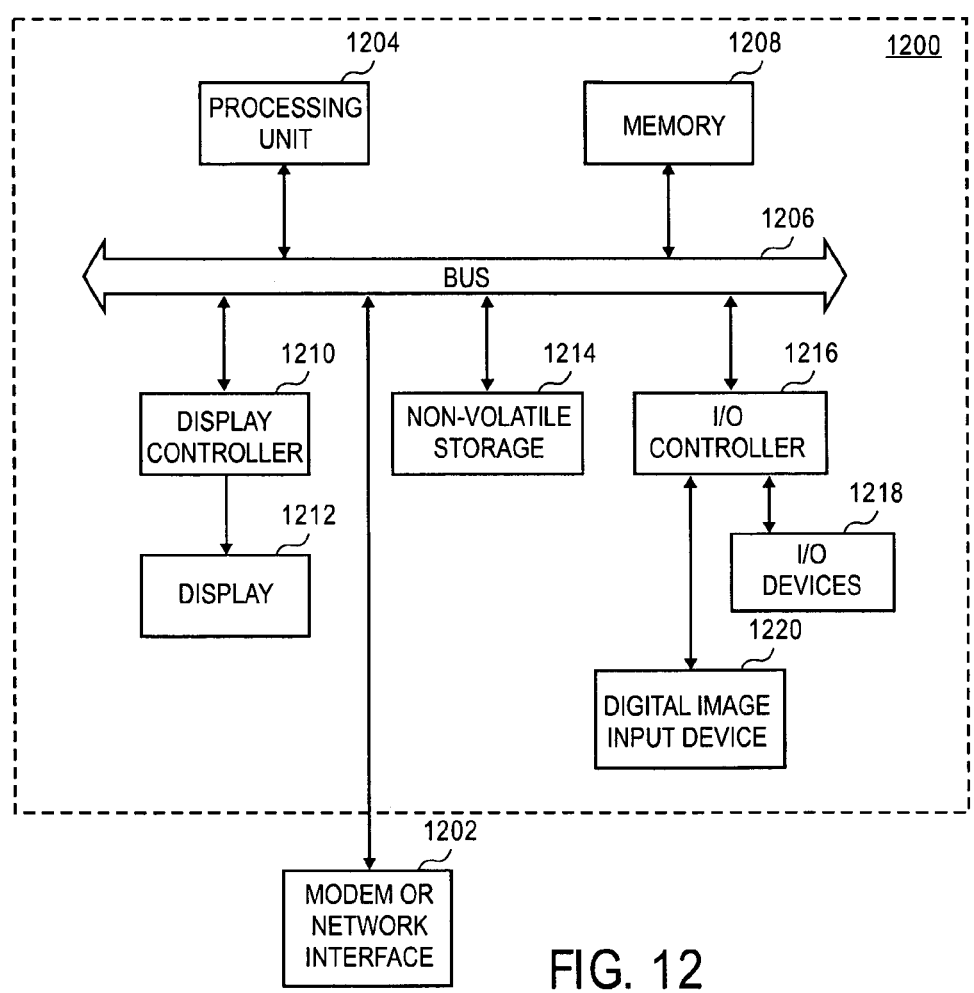
FIG. 12 is a diagram of one embodiment of a data processing system, such as a general purpose computer system, suitable for use in the operating environment of FIG. 9.

The following description of FIG. 12 is intended to provide an overview of computer hardware and other operating components suitable for performing the processes of the invention described above, but are not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 12 shows one example of a conventional computer system that can be used in one or more aspects of the invention. The computer system 1200 interfaces to external systems through the modem or network interface 1202. It will be appreciated that the modem or network interface 1202 can be considered to be part of the computer system 1200. This interface 1202 can be an analog modem, ISDN modem, cable modem, token ring interface, satellite transmission interface, or other interfaces for coupling a computer system to other computer systems. The computer system 1202 includes a processing unit 1204, which can be a conventional microprocessor such as an Intel Pentium microprocessor or Motorola Power PC microprocessor. Memory 1208 is coupled to the processor 1204 by a bus 1206. Memory 1208 can be dynamic random access memory (DRAM) and can also include static RAM (SRAM). The bus 1206 couples the processor 1204 to the memory 1208 and also to non-volatile storage 1214 and to display controller 1210 and to the input/output (I/O) controller 1216. The display controller 1210 controls in the conventional manner a display on a display device 1212 which can be a cathode ray tube (CRT) or liquid crystal display (LCD). The input/output devices 1218 can include a keyboard, disk drives, printers, a scanner, and other input and output devices, including a mouse or other pointing device. The display controller 1210 and the I/O controller 1216 can be implemented with conventional well known technology. A digital image input device 1220 can be a digital camera which is coupled to an I/O controller 1216 in order to allow images from the digital camera to be input into the computer system 1200. The non-volatile storage 1214 is often a magnetic hard disk, an optical disk, or another form of storage for large amounts of data. Some of this data is often written, by a direct memory access process, into memory 1208 during execution of software in the computer system 1200. One of skill in the art will immediately recognize that the terms "computer-readable medium" and "machine-readable medium" include any type of storage device that is accessible by the processor 1204 or by other data processing systems such as cellular telephones or personal digital assistants or MP3 players, etc. and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1208 for execution by the processor 1204. A Web TV system, which is known in the art, is also considered to be a computer system according to the embodiments of the present invention, but it may lack some of the features shown in FIG. 12, such as certain input or output devices. A typical computer system will usually include at least a processor, memory, and a bus coupling the memory to the processor.

It will be appreciated that the computer system 1200 is one example of many possible computer systems, which have different architectures. For example, personal computers based on an Intel microprocessor often have multiple buses, one of which can be an input/output (I/O) bus for the peripherals and one that directly connects the processor 1204 and the memory 1208 (often referred to as a memory bus). The buses are connected together through bridge components that perform any necessary translation due to differing bus protocols.

It will also be appreciated that the computer system 1200 is controlled by operating system software, which includes a file management system, such as a disk operating system, which is part of the operating system software. One example of an operating system software with its associated file management system software is the family of operating systems known as WINDOWS OPERATING SYSTEM from Microsoft Corporation in Redmond, Wash., and their associated file management systems. The file management system is typically stored in the non-volatile storage 1214 and causes the processor 1204 to execute the various acts required by the operating system to input and output data and to store data in memory, including storing files on the non-volatile storage 1214.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for updating a forecast model comprising:
   receiving an original forecast model created at a reference M, the reference M including a first date;
   receiving an original data and an additional data to determine an error of the forecast model, the additional data created from the reference M to a reference N, the reference N including a second date wherein the original data is the data created up to reference M and the additional data is the data created or added from reference M to reference N and further wherein the original data is a portion of the data created up to reference N;
   identifying an at least one parameter to be changed in value in, added to, or removed from the original forecast model;
   determining the error of the forecast model using an at least one of the group consisting of:
      the original data based on the portion of the data created up to the reference N; and
      the additional data; and
   modifying the forecast model to reduce the error of the forecast model, wherein modifying the forecast model includes an at least one of the group consisting of:
      changing the value of the identified parameter in the forecast model;
      adding the identified parameter to the original forecast model; and
      removing the identified parameter from the original forecast model.

2. The method of claim 1, wherein the forecast model is to quantify a marketing of a product or service to a demand for the product or service.

3. The method of claim 1, wherein modifying the forecast model includes using a metaheuristic algorithm to minimize the error of the forecast model.

4. The method of claim 3, wherein the metaheuristic algorithm used is a genetic algorithm.

5. The method of claim 1, further comprising:
   determining a maximum amount of time to update the forecast model; and
   halting any further modifying of the forecast model if the amount of time spent modifying the forecast model exceeds the maximum amount of time.

6. The method of claim 5, wherein the maximum amount of time to update the forecast model is specified by a user.

7. The method of claim 1, further comprising halting any further modifying of the forecast model if the error of the forecast model is determined to be below a threshold.

8. The method of claim 7, wherein the threshold is specified by a user.

9. The method of claim 1, wherein the at least one parameter is specified by a user.

10. The method of claim 1, wherein changing the value of the identified parameter in the forecast model includes changing the value within a specified range of values.

11. The method of claim 10, wherein the range of values is specified by a user.

12. The method of claim 1, wherein the error of the forecast model is quantified by an objective function.

13. The method of claim 12, wherein reducing the error includes reducing the output of the objective function.

14. The method of claim 1, wherein:
   the reference M is a point in time M;
   the reference N is a point in time N; and
   the original data and the additional data are created and measured in the dimension of time.

15. A machine-readable medium having executable instructions to cause a processor to perform a method for updating a forecast model, comprising:
   receiving an original forecast model created at a reference M, the reference M including a first date;
   receiving an original data and an additional data to determine an error of the forecast model, the additional data created from the reference M to a reference N, the reference N including a second date, wherein the original data is the data created up to reference M and the additional data is the data created or added from reference M to reference N and further wherein the original data is a portion of the data created up to reference N;

identifying an at least one parameter to be changed in value in, added to, or removed from the original forecast model;

determining the error of the forecast model using an at least one of the group consisting of:
the original data based on the portion of the data created up to the reference N; and
the additional data; and modifying the forecast model to reduce the error of the forecast model, wherein modifying the forecast model includes an at least one of the group consisting of:
changing the value of the identified parameter in the forecast model;
adding the identified parameter to the original forecast model; and
removing the identified parameter from the original forecast model.

16. The machine-readable medium of claim 15, wherein the forecast model is to quantify a marketing of a product or service to a demand for the product or service.

17. The machine-readable medium of claim 15, wherein modifying the forecast model includes using a metaheuristic algorithm to minimize the error of the forecast model.

18. The machine-readable medium of claim 17, wherein the metaheuristic algorithm used is a genetic algorithm.

19. The machine-readable medium of claim 15, further comprising:
determining a maximum amount of time to update the forecast model; and
halting any further modifying of the forecast model if the amount of time spent modifying the forecast model exceeds the maximum amount of time.

20. The machine-readable medium of claim 19, wherein the maximum amount of time to update the forecast model is specified by a user.

21. The machine-readable medium of claim 15, wherein the method further comprises halting any further modifying of the forecast model if the error of the forecast model is determined to be below a threshold.

22. The machine-readable medium of claim 21, wherein the threshold is specified by a user.

23. The machine-readable medium of claim 15, wherein the at least one parameter is specified by a user.

24. The machine-readable medium of claim 15, wherein changing the value of the identified parameter in the forecast model includes changing the value within a specified range of values.

25. The machine-readable medium of claim 24, wherein the range of values is specified by a user.

26. The machine-readable medium of claim 15, wherein the error of the forecast model is quantified by an objective function.

27. The machine-readable medium of claim 26, wherein reducing the error includes reducing the output of the objective function.

28. The machine-readable medium of claim 15, wherein:
the reference M is a point in time M;
the reference N is a point in time N; and
the original data and the additional data are created and measured in the dimension of time.

29. An apparatus for updating a forecast model comprising:
a module to receive an original forecast model created at a reference M, the reference M including a first date;
a data collection module to receive an original data and an additional data to determine an error of the forecast model, the data created from the reference M to a reference N, the reference N including a second date, wherein the original data is the data created up to reference M and the additional data is the data created or added from reference M to reference N and further wherein the original data is a portion of the data created up to reference N;

an identification module to identify an at least one parameter to be changed in value in, added to, or removed from the original forecast model;

an error determination module to determine the error of the forecast model using an at least one of the group consisting of:
the original data based on the portion of the data created up to the reference N; and
the additional data; and an update module to modify the forecast model to reduce the error of the forecast model, wherein modifying the forecast model includes an at least one of the group consisting of:
changing the value of the identified parameter in the forecast model;
adding the identified parameter to the original forecast model; and
removing the identified parameter from the original forecast model.

30. The apparatus of claim 29, wherein the forecast model is to quantify a marketing of a product or service to a demand for the product or service.

31. The apparatus of claim 29, wherein modifying the forecast model includes using a metaheuristic algorithm to minimize the error of the forecast model.

32. The apparatus of claim 31, wherein the metaheuristic algorithm used is a genetic algorithm.

33. The apparatus of claim 29, further comprising:
a module to determine a maximum amount of time to update the forecast model; and
a module to halt any further modifying of the forecast model if the amount of time spent modifying the forecast model exceeds the maximum amount of time.

34. The apparatus of claim 33, wherein the maximum amount of time to update the forecast model is specified by a user.

35. The apparatus of claim 29, further comprising a module to halt any further modifying of the forecast model if the error of the forecast model is determined to be below a threshold.

36. The apparatus of claim 35, wherein the threshold is specified by a user.

37. The apparatus of claim 29, wherein the at least one parameter is specified by a user.

38. The apparatus of claim 29, wherein changing the value of the identified parameter in the forecast model includes changing the value within a specified range of values.

39. The apparatus of claim 38, wherein the range of values is specified by a user.

40. The apparatus of claim 29, wherein the error of the forecast model is quantified by an objective function.

41. The apparatus of claim 39, wherein reducing the error includes reducing the output of the objective function.

42. The apparatus of claim 29, wherein:
the reference M is a point in time M;
the reference N is a point in time N; and
the original data and the additional data are created and measured in the dimension of time.

* * * * *